June 2, 1942.　　T. H. AINSWORTH　　2,285,138
LOCOMOTIVE DRIVING WHEEL CENTER
Filed June 3, 1939　　2 Sheets-Sheet 1
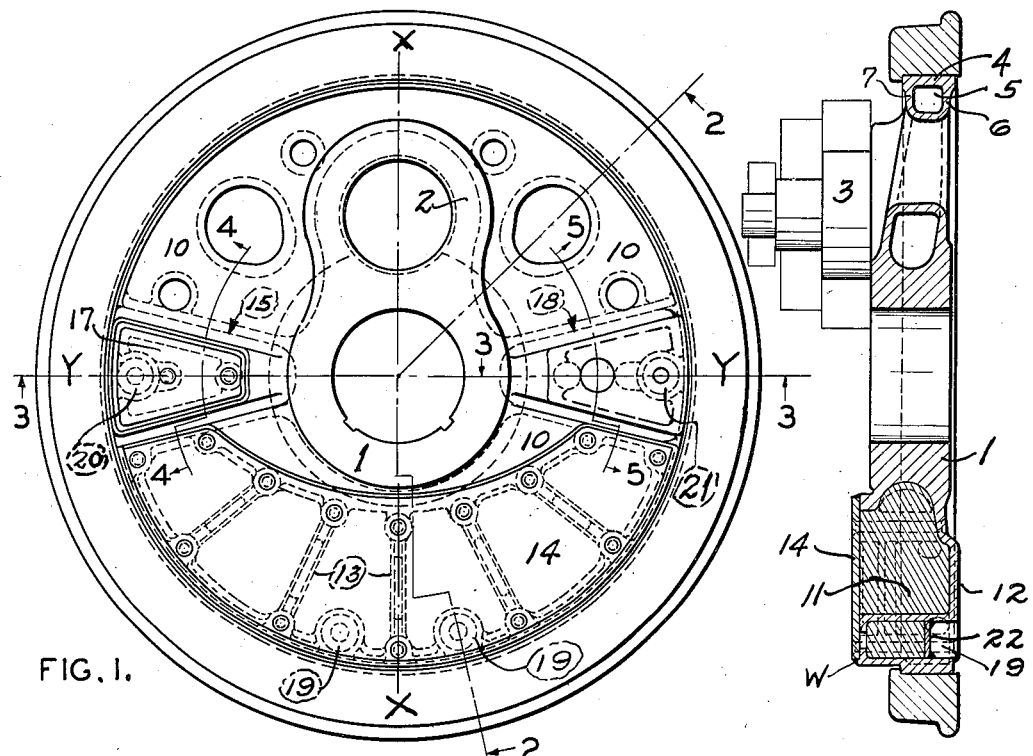
FIG. 1.
FIG. 2.
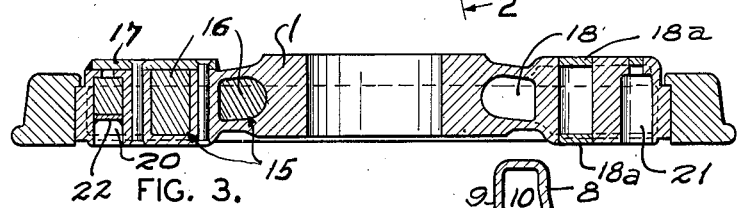
FIG. 3.
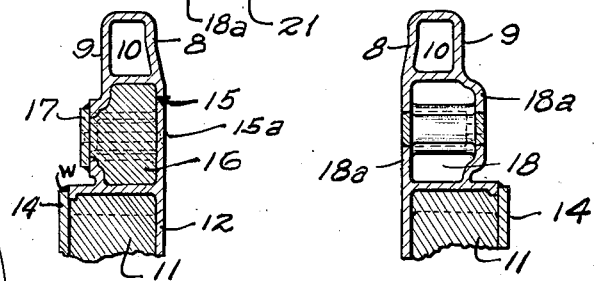
FIG. 4.　　FIG. 5.
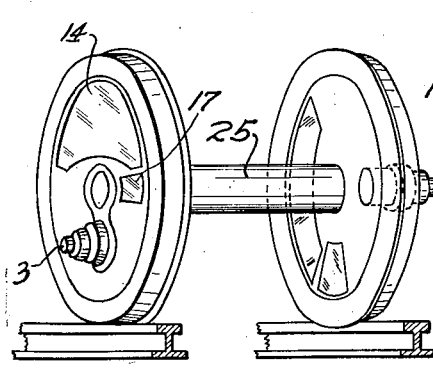
FIG. 13
INVENTOR
THOMAS H. AINSWORTH
BY Rodney Bedell
ATTORNEY June 2, 1942. T. H. AINSWORTH 2,285,138
LOCOMOTIVE DRIVING WHEEL CENTER
Filed June 3, 1939 2 Sheets-Sheet 2

INVENTOR
THOMAS H. AINSWORTH
BY Rodney Bedell
ATTORNEY

Patented June 2, 1942

2,285,138

UNITED STATES PATENT OFFICE 2,285,138

LOCOMOTIVE DRIVING WHEEL CENTER

Thomas H. Ainsworth, Drexel Hill, Pa., assignor to General Steel Castings Corporation, Granite City, Ill., a corporation of Delaware Application June 3, 1939, Serial No. 277,121

15 Claims. (Cl. 295—6)

The invention relates to driving wheels such as are generally used on railway locomotives in which the usual crank pin and its load of side rods, main rod, eccentric crank, etc. is counterbalanced.

It is the general practice to cross counterbalance each main driving wheel with the wheel at the other end of the same axle because of the overhang or out-of-plane action of the crank pin load by placing a corresponding counterweight in the opposite wheel. As the cranks in the two wheels on the same axle are set 90° apart, angularly of the wheels, the forces set up in one wheel by the revolution of the overhang weight in the other wheel are directed at right angles to a line through the first wheel's crank pin and axle centers and this cross force should be balanced by a counterweight in addition to or independent of the counterbalance in that wheel for its own crank pin and load. It has been customary to combine the cross balance weight and the ordinary counterbalance weight, but in order to do this it is necessary to set the combined weight at an angle to the line through the crank pin and axle centers.

Due to variations in molding and casting it is often difficult to cast and machine wheels so that the proper angle is obtained to preserve the cross balance and counterbalance values. The problems encountered in the operation of locomotive drivers with the crank pin loads are accentuated by the increased sizes and speeds of locomotives with their high piston thrust, greater wheel loads and heavier revolving and reciprocating parts and accompanying greater overhang of side rods, main rod and eccentric cranks. This is evidenced by the fact that the yearly number of rail failures is steadily mounting.

The main object of the present invention is to provide for smoother operation of the locomotive by reducing the rail blow likely to result from the rotation of the heavy overhanging crank pin loads. In attaining this object it is desirable to obtain greater accuracy in the counterbalancing and this may be obtained by constructing each wheel so it may be statically balanced before adding the cross balancing weight.

These objects are attained by the structures illustrated in the accompanying drawings in which Figure 1 is a side elevation of a driving wheel center and tire, embodying one form of the invention.

Figure 2 is a transverse section taken on the line 2—2 of Figure 1, and showing a crank pin and the parts carried thereby.

Figures 3, 4 and 5 are detail transverse sections taken on the corresponding section lines of Figure 1.

Figure 13 is a perspective illustrating the assembly on one axle of two wheels, as detailed in the other figures.

Figure 6:
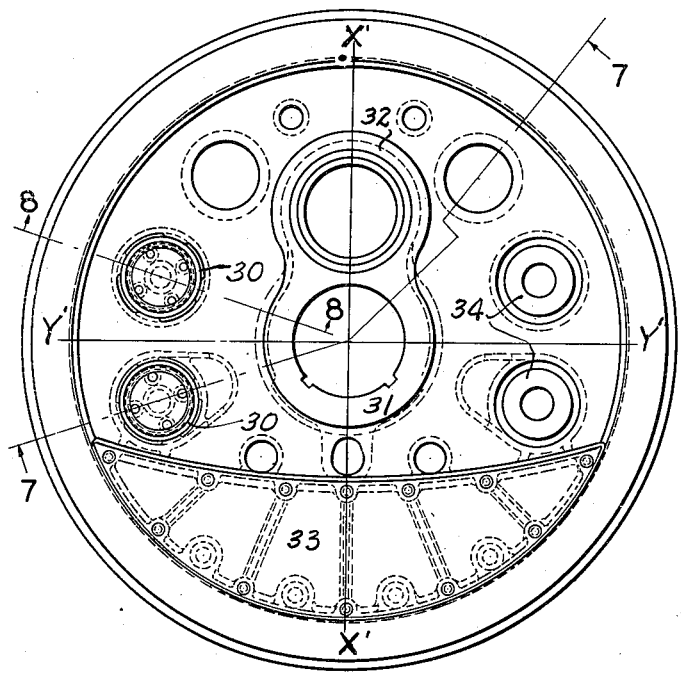
Figure 6 is a side elevation corresponding to Figure 1 but illustrating another form of the invention.

Each of the detailed figures illustrates a cast metal wheel center with a separately formed tire mounted thereon. It is to be understood that while the following description relates to the wheel center, the structure described may be embodied in a wheel which includes the tires as integral parts thereof. In the form of the invention shown in Figures 1-5, the wheel center includes the usual solid metal hub 1 for the wheel axle and a lateral extension thereon forming a solid metal hub 2 for the crank pin 3. The peripheral web 4 forms one wall of a hollow box shape rim 5 having inner and outer webs 6 and 7 respectively, merging with the inner and outer walls 8 and 9 respectively of box shape sections 10, 10, etc., extending between hub 1 and rim 5. Five such sections are illustrated, one standing upright and including the crank pin hub, one at each side of the upright section, sectioned in Figures 4 and 5 respectively, and one below each of the latter mentioned sections and merging with the elongated counterbalance.

The portion of the wheel center diametrically opposite to crank pin hub 2 forms an elongated pocket for the main counterbalance material 11. This pocket has a rear wall 12 and transverse ribs 13 cast integral with the rest of the wheel center, and a cover plate 14 is applied over the counterbalance material and welded in place when the wheel is completed. The pocket and counterbalance material are disposed symmetrically about the line X—X which extends through the axes of hubs 1 and 2. It will be understood that the weight of the pocket structure and the counterbalance material contained therein will correspond to the weight of crank pin 3 and its load, taking into consideration the distance between the wheel axis and the center of gravity of the crank pin and its load, and the distance between the wheel axis and the center of gravity of the counterbalance.

The cross counterbalance is indicated at the left hand side of Figure 1 and is disposed symmetrically about a line Y—Y passing through the wheel axis and extending at right angles to line X—X. The cross counterbalance includes a pocket 15 having side walls formed by the sides of adjacent sections 10, and having a rear wall 15a extending between adjacent sections 10 and transversely of the wheel axis. The pocket is adapted to receive the cross balance material 16 which may be applied in molten state and will be retained in place by a cover plate 17 secured to the sides of the pocket by welds W.

At the side of the wheel axis opposite pocket 15 the wheel center is provided with a corresponding pocket 18 having front and rear walls 18a.

Each of pockets 15 and 18 is provided with a hollow boss forming a relatively small pocket, 20 and 21 respectively, in which small quantities of counterbalance material may be inserted to statically balance the wheel before the cross counterbalance material 16 is added to pocket 15. The material in pockets 20 and 21 is retained by disks 22. The main counterbalance is provided with similar small pockets 19 disposed symmetrically about line X—X whereby fine adjustment of the counterbalance may be effected.

With this construction the two wheel centers (or the complete wheels) mounted on an axle 25 (Figure 13) may be statically balanced by applying material as required to pockets 19, 20 and 21; then cross balanced by applying weights to the crank pins (corresponding to the loads they carry in service) and then adding material 16 of the required amount, as calculated, to each pocket 15 to offset the load on the crank pin on the wheel at the opposite end of the axle, and no further balancing is necessary.

With this construction the center of the cross balance counterweight is located at 90° from the center of the main counterbalance and the balancing of the wheel is more readily effected than if it were necessary to make adjustments simultaneously for counterbalancing the crank pin load and the cross balance load.

Figures 7, 8:
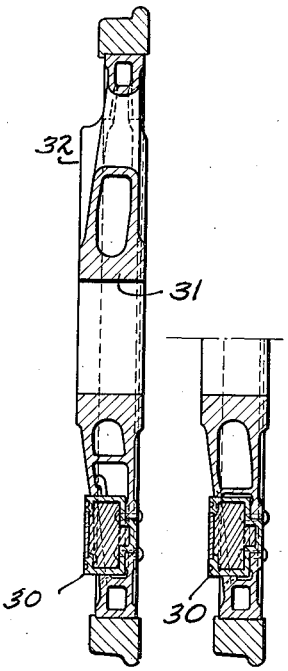
Figures 7 and 8 are transverse sections taken on the corresponding section lines of Figure 6.
Figure 9:
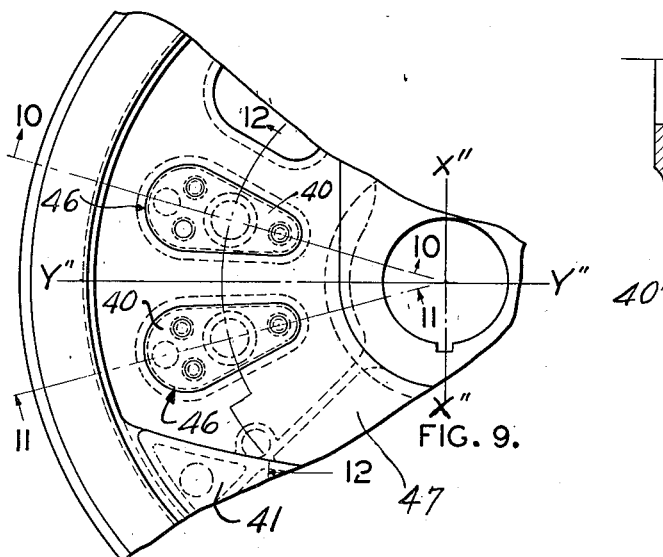
Figure 9 is a fragmentary side elevation of a wheel embodying another form of the invention.
Figures 10, 11:
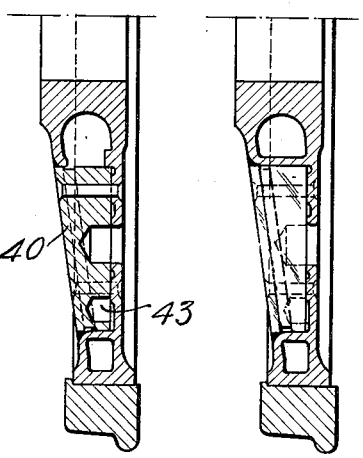
Figures 10, 11 and 12 are detail transverse sections taken on the corresponding section lines of Figure 9.
Figure 12:
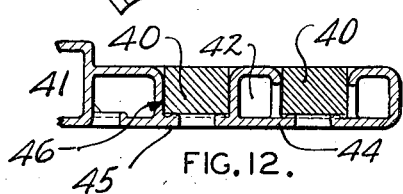

The same general results are attained by the structures shown in Figures 6, 7 and 8 but the cross balance is provided by two hollow circular blocks 30 filled with counterbalance material and disposed symmetrically about the line Y'—Y', which is at right angles to the line X'—X' extending through the axes of the wheel hub 31 and crank pin hub 32.

The circular blocks can be readily machined and accurately fitted into the pockets in the wheels. They are spaced from and independent of the main counterbalance 33 and, at the opposite side of the wheel axis, individual supplementary pockets 34 are provided for statically balancing the wheel and axle assembly before blocks 30 are applied to cross balance the wheel. Blocks 30 can be weighed while empty and then applied by rivets as shown and then enough additional material can be added and a cover plate (as shown) applied to provide for the correct amount of cross balance counterweight. In this structure there is a central upright box section which includes the crank pin hub, and two box sections at each side of the upright section, the openings 35 being between the upright section and the adjacent sections and the upper pockets 30 and 34 being between the latter mentioned sections and the sections merging with the counterbalance and including the lower pockets 30 and 34.

Similarly, Figures 9 to 12 illustrate a structure in which two cross balance counterweights 40 are provided at opposite sides of line Y"—Y" extending at right angles to line X"—X", passing through the wheel axis and the center of the main counterbalance 41. A box-shaped section 47 merges with main counterbalance 41 and a wider box-shaped section 42 includes an inner web 44 forming the inner wall of pocket 46 provided in the spoke, and an extension 45 of web 44 forms the inner wall of pocket 46a provided between sections 42 and 47. The one-piece balance weights 40 are shown riveted to web 44—45. Weights 40 may be adjusted for weight before their application to the wheel by drilling openings 43 deeper or by adding material and disks to openings 43 as previously described in connection with pockets 19, 20 and 21.

The corresponding portion of the wheel at the opposite side of line X"—X" is provided with pockets similar to those indicated at 46 so that the wheel will be symmetrical and the static balancing of the wheels and axle will be facilitated before weights 40 are added to the one side only.

Any of the structures described may be used in following the method outlined, namely the static balancing of the wheel and axle assembly before the cross balance weights are added. If desired, the wheels may be counterbalanced statically individually before being mounted on the axle and cross balanced.

These are steps which cannot be followed where the cross balance and counterbalance are combined, nor could any form of counterbalancing be adjusted so readily as is possible with the separation of the main counterbalance and the cross balance as described.

It will be understood that the methods of applying the cross counterbalance may be varied from the manner as shown without departing from the spirit of the invention, also that it is unnecessary to utilize all of the features described to obtain some of the objects set forth, and the exclusive use of such modifications of the invention as come within the scope of the claims is contemplated.

What is claimed is:

1. In a locomotive driving wheel center, a crank pin hub, a counterbalance diametrically opposite said hub for said hub and its pin and the pin load, and a pair of pockets disposed symmetrically about a line through the axle center and extending 90° to a line between the center of said load and counterbalance, said pockets being arranged for weights for cross counterbalancing the crank pin and load on the other wheel on the same axle.

2. A wheel center as described in claim 1 which also includes spaced parts, diametrically opposite the pockets for the cross balance weights, for balancing the wheel statically before corrective material and the cross balance weights are added.

3. A locomotive driving wheel center adapted to form a part of a wheel and axle assembly and having a crank pin and a counterbalance for said crank pin and its normal crank pin load, said wheel center including a pocket structure having elements for receiving a cross balance counterweight, independently of said counterbalance, for cross balancing a crank pin and its load on another wheel forming another part of said assembly, said pocket elements forming a circular opening in the wheel center and being adapted to engage said counterweight so as to hold said counterweight in position against revolving forces, and means for securing said counterweight to the wheel center so as to prevent lateral displacement of said counterweight relative to the wheel center.

4. A locomotive driving wheel center as described in claim 3 which also includes means on the wheel center on the side of the wheel center axis diametrically opposite to the cross balance counterweight pocket to facilitate static balancing of the wheel center before corrective material and the cross balance counterweight is applied.

5. A locomotive driving wheel center as described in claim 3 which also includes a pocket structure in the wheel center on the side of the wheel center axis diametrically opposite to the cross balance counterweight pocket structure to facilitate static balancing of the wheel center before corrective material and the cross balance counterweight is applied, said pocket structures being substantially the same in weight and contour.

6. In a locomotive wheel and axle assembly, an axle, a driving wheel at each end portion of said axle, each of said wheels having a crank pin and a counterbalance for said crank pin and its load, a cross balance counterweight for each wheel for cross balancing the crank pin and its load on the opposite wheel, each of said wheels having a circular opening, independently of the counterbalance, and each cross balance counterweight having a cylindrical portion adapted to fit into the opening in the wheel to position the counterweight, and means for securing each counterweight to its respective wheel.

7. An assembly as described in claim 6 in which each wheel is provided with another opening on the side of its axis opposite the cross balance counterweight opening, said other opening corresponding substantially in size and contour to the opening in which the counterweight is inserted to facilitate balancing the wheel statically before corrective material and the cross balance weight is applied.

8. In a locomotive driving wheel center, a hub for the wheel axle, a crank pin hub at one side of said axle hub, a main counterbalance for said crank pin hub and its pin and its pin load, located diametrically opposite said pin hub and disposed symmetrically about a line extending through the center of said hubs, the differences in contour of said wheel center on the crank pin side and the counterbalance side consisting solely in the differences between the contours of said crank pin hub and pin and said main counterbalance, said wheel center including a pocket structure at one side of said line and disposed symmetrically about another line extending through the axle center and at an angle of 90° to said first mentioned line, said pocket structure being arranged to receive material for cross counterbalancing the crank pin hub and its pin and load on another wheel on the same axle.

9. A locomotive driving wheel center adapted to form a part of a wheel and axle assembly and having a crank pin and a main counterbalance for said crank pin and its load diametrically opposite said pin, pocket structure in said wheel center at opposite sides of said axle hub and arranged symmetrically about a center line extending through the axle center at an angle of 90° to the line through the crank pin and axle centers, said pocket structure on both sides of the center line extending through crank pin and axle centers including two separate compartments, one of said compartments being adapted to receive material for adjusting the weight of the wheel on each side of the center line through crank pin and axle centers to balance the wheel statically and the other compartment of at least one of said pockets arranged to receive a counterweight for cross balancing a crank pin and its load on another wheel center forming another part of the wheel and axle assembly.

10. A locomotive driving wheel center adapted to form a part of a wheel and axle assembly and having a crank pin and a main counterbalance for said crank pin and its load diametrically opposite said pin, pockets in said wheel center formed separately from said counterbalance and located at opposite sides of a straight line extending through the centers of said pin, axle and counterbalance, each of said pockets comprising two separately formed closed compartments adapted to receive counterweight material, one of said compartments being adapted to receive material for adjusting the weight of the wheel on each side of said center line to balance the wheel statically and the other compartment of at least one of said pockets arranged to receive a counterweight for cross balancing a crank pin and its load on another wheel center forming another part of the wheel and axle assembly.

11. A locomotive driving wheel center adapted to form a part of a wheel and axle assembly and having a crank pin hub and a crank pin and a main counterbalance for said pin and its load located diametrically opposite said pin, the differences in contour of said wheel center on the crank pin side and the counterbalance side consisting solely in the differences between the contours of said hub and said main counterbalance, said wheel center including a closed pocket structure having elements for engaging and retaining a cross balance counterweight, independently of said counterbalance, for cross balancing a crank pin and its load on another wheel forming another part of said assembly, said pocket structure and counterweight being positioned at one side of a line extending through the centers of the crank pin, axle and counterbalance and symmetrically about a line extending through the axle center and disposed at 90° to said first-mentioned center line, there being means at the opposite side of said first-mentioned center line to balance the weight of said pocket structure to facilitate static balancing of said wheel center before corrective material and said cross balance counterweight is applied.

12. A locomotive driving wheel center as described in claim 11 in which the pocket balancing means comprises a pocket of the same capacity and contours as the closed pocket structure and located diametrically opposite the latter.

13. A locomotive driving wheel center as described in claim 11 in which the closed pocket structure includes a material retaining element extending in a plane transversely to the axis of the axle.

14. In an assembly of a locomotive driving axle with wheels at opposite ends thereof, crank pins on said wheels disposed at a 90° angle to each other about the axis of the assembly, a main counterbalance in each wheel located diametrically opposite the crank pin of the same wheel, a recess structure in each of said wheels symmetrical about a straight line extending through the axle centers and at right angles to a line extending through the centers of the crank pin and axle, said structure in each wheel also being located on the same side of the axle as the crank pin of the wheel on the opposite end of the axle, said structure in each wheel being adapted to receive means for cross balancing the crank pin of the wheel on the opposite end of the axle and its crank pin load, there being means formed in each wheel located diametrically opposite to said structure in that wheel to facilitate static balancing of the wheel before adding corrective material and the cross balancing means.

15. A wheel and axle assembly as described in claim 14 in which the recess in each wheel is provided with a bottom member extending in a plane transversely of the axis of the axle.

THOMAS H. AINSWORTH.